United States Patent
Shang et al.

(10) Patent No.: US 11,060,930 B2
(45) Date of Patent: Jul. 13, 2021

(54) GLASS SURFACE STRESS METER AND MULTIPLE-TEMPERED GLASS SURFACE STRESS METER

(71) Applicant: SUZHOU PTC OPTICAL INSTRUMENT CO., LTD, Jiangsu (CN)

(72) Inventors: Xiuxin Shang, Jiangsu (CN); Xudong Wang, Jiangsu (CN); Xiupu Wang, Jiangsu (CN); Fei Yan, Jiangsu (CN); Xiang Tang, Jiangsu (CN); You Wang, Jiangsu (CN)

(73) Assignee: Suzhou PTC Optical Instrument Co., Ltd, Jiangsu (CN)

( * ) Notice: Subject to any disclaimer, the term of this patent is extended or adjusted under 35 U.S.C. 154(b) by 574 days.

(21) Appl. No.: 15/763,455

(22) PCT Filed: Sep. 30, 2016

(86) PCT No.: PCT/CN2016/101161
§ 371 (c)(1),
(2) Date: Mar. 27, 2018

(87) PCT Pub. No.: WO2017/054773
PCT Pub. Date: Apr. 6, 2017

(65) Prior Publication Data
US 2018/0274997 A1    Sep. 27, 2018

(30) Foreign Application Priority Data

Sep. 30, 2015  (CN) .......................... 201510638763.3
Oct. 30, 2015  (CN) .......................... 201510726582.6
Nov. 27, 2015  (CN) .......................... 201510844432.5

(51) Int. Cl.
*G01L 1/24*     (2006.01)
*H04N 5/225*   (2006.01)
(Continued)

(52) U.S. Cl.
CPC ............... *G01L 1/24* (2013.01); *G01L 1/241* (2013.01); *H04N 5/2258* (2013.01);
(Continued)

(58) Field of Classification Search
CPC .................................. G01L 1/24; G01L 1/241
See application file for complete search history.

(56) References Cited

U.S. PATENT DOCUMENTS 4,353,649 A * 10/1982 Kishii .................... G01N 21/43
                                                                 356/137
4,539,475 A *  9/1985 Bosse .................... G01G 3/125
                                                                 250/231.1
(Continued)

FOREIGN PATENT DOCUMENTS

CN       201716137 U      1/2011
CN       102062656 A      5/2011
(Continued)

*Primary Examiner* — Kara E. Geisel
*Assistant Examiner* — Rufus L Phillips
(74) *Attorney, Agent, or Firm* — Gang Yu

(57) ABSTRACT

The invention provides a glass surface stress meter and multiple-tempered glass surface stress meter, and the glass surface stress meter includes a light source (810, 910), a light refraction element (820, 920) and an imaging unit. The light refraction element (820, 920) is provided at a light-emitting direction of the light source (810, 910) for placing a measured glass (970). The light from the light source (810, 910) comes into the imaging unit to imaging after refracted by the light refractive element (820, 920). The imaging unit includes lens group (830, 940) and a imaging sensor (840, 960). A front end of the lens group is provided at the light-refraction direction of the light refraction element (820, 920) and a back-end is provided with the imaging sensor.

5 Claims, 6 Drawing Sheets

(51) Int. Cl.
C03B 27/04 (2006.01)
C03B 27/044 (2006.01)
H04N 5/335 (2011.01)

(52) U.S. Cl.
CPC ...... *C03B 27/0413* (2013.01); *C03B 27/0442* (2013.01); *H04N 5/335* (2013.01)

(56) References Cited

U.S. PATENT DOCUMENTS

| | | | | |
|---|---|---|---|---|
| 4,777,358 | A | * | 10/1988 | Nelson .................... G01L 1/241 250/225 |
| 9,140,534 | B2 | | 9/2015 | Manlay |
| 9,140,543 | B1 | * | 9/2015 | Allan ..................... G01B 11/16 |
| 2011/0033103 | A1 | * | 2/2011 | Furnas ................. G01L 5/0047 382/141 |
| 2014/0368808 | A1 | * | 12/2014 | Roussev ................... G01L 1/24 356/32 |
| 2015/0066393 | A1 | * | 3/2015 | Liu .................... G01N 21/4133 702/42 |

FOREIGN PATENT DOCUMENTS

| | | |
|---|---|---|
| CN | 103443603 A | 12/2013 |
| CN | 103644990 A | 3/2014 |
| CN | 203490010 U | 3/2014 |
| CN | 203587256 U | 5/2014 |
| CN | 103955050 A | 7/2014 |
| CN | 104359924 A | 2/2015 |
| CN | 204479219 U | 7/2015 |
| CN | 204535899 U | 8/2015 |
| CN | 105115635 A | 12/2015 |
| CN | 105241593 A | 1/2016 |
| CN | 105333980 A | 2/2016 |
| CN | 205027468 U | 2/2016 |
| CN | 205066980 U | 3/2016 |
| CN | 205120285 U | 3/2016 |
| JP | S5533675 A | 3/1980 |
| JP | S57157130 A | 9/1982 |
| JP | H11281501 A | 10/1999 |
| JP | 2010181148 A | 8/2010 |
| WO | 2015164243 A1 | 10/2015 |

* cited by examiner

GLASS SURFACE STRESS METER AND MULTIPLE-TEMPERED GLASS SURFACE STRESS METER

TECHNICAL FIELD

The invention relates to a stress detecting device, more particularly to a glass surface stress meter and multiple-tempered glass surface stress meter.

BACKGROUND

As we known, a tempered glass is also called a reinforced glass, it is a kind of prestress glass. Usually it adopts a chemical or physical method to form press stress on a surface of the glass, and it off-sets the surface stress when bearing an external force, thus, carrying capacity is improved. As a result, tempered glass is widely used in building doors and windows, window walls and electronic instruments and other industries. Glass strength will be reduced due to large amounts micro-crocks will occur on an edge after the tempered glass is cut. Especially with the development of the touch industry specification of the touch product itself is more strict. With the touch panel to achieve the application effect by the operation method that press external pressure to react the assembly, a mechanical anti-pressure becomes to be important regulations and index to major manufactures. Under this market background the tempered glass comes to the market. The multiple-tempered glass is that strengthen the reinforced glass repeatedly by a chemical or physical method to improve the compressive properties substantially.

In addition, although the bearing capacity has been improved due to a stress after the glass is tempered. However, the stress is usually extremely uneven that will reduce the mechanical strength and thermal stability which will affect the safety and even self explosion. Especially with a flourish development of the touch industry, specifications of the touch products have been more and more strict. The operation method that exerting an external pressure to induce component to achieve a use effect. Therefore, the mechanical anti-pressure is the important regulation and index for various manufacturers. Large stress influences the optical light transmission and imaging quality for optical glass seriously.

With the rapid development of modern science and technology, especially for the mobile phone screen has been changing fast, and curved glass screen mobile phone which has the advantage of more accordant with ergonomics and customer's behaviour has come to the market. Curved glass is that the entire glass is not on the same line which usually has arc, J-type, V-type, double-edged curved type, double type, etc. Manufacturing process of the curved glass is much more complex than that of the flat glass. Firstly, the glass plate is heated in the heating section, which is heated to the glass transition temperature or above. The heated high temperature glass is sent to the forming section with inner concave forming surface by the heating furnace, and then the glass plate hang down and bend to the inner curved surface by its own gravity, thus form to curved glass with unequal arcs. Finally, transfer the bending high temperature glass to the tempering section to cool. Although the bearing capacity has been improved due to the produced stress after the curved glass is tempered. However, the stress is usually extremely uneven that will reduce the mechanical strength and thermal stability which will affect the safety using of glass products and even self explosion when in serious situation. Large stress influences the optical light transmission and imaging quality for optical glass seriously.

As a result, a glass stress should be controlled in a prescribed range to assure a using performance of glass products, and thus the glass stress is required to be tested.

SUMMARY OF THE INVENTION

The purpose of the invention is that provides a glass surface stress meter and a multiple-tempered glass surface stress meter to solve the problem in the prior art that the glass surface stress is hard to test.

According to one aspect of the present invention that provides a glass surface stress meter comprises a light source, a light refraction element and an imaging unit, the light refraction element is provided at a light-emitting direction of the light source for placing a measured glass, a light from the light source enters into the imaging unit to imaging after refracted by the light refraction element, the imaging unit comprises a lens group and an imaging sensor, a front-end of the lens group is provided on a light-refraction direction of the light refraction element and a back-end is provided with an imaging sensor.

Further, the light refraction element is a triangular prism with one curved surface.

Further, the triangular prism is an isosceles triangular prism, and an underside of the isosceles triangular prism is a curved surface, also a chief ray emitted by the light source is perpendicular to a waist of the isosceles triangular prism.

Further, the lens group is a micro-objective when the curved surface of the isosceles triangular prism is a concave surface, also a working distance of the micro-objective is greater than half of a length of a base of the isosceles triangular prism.

Further, a curvature of the curved surface of the triangular prism is the same with a curvature of a curved surface glass to be measured.

Further, the light refraction element is provided with a first refraction prism and a second refraction prism along a direction of an optical path, the front-end of the lens group is provided on a light refraction direction of the second prism, the imaging unit also comprises a polarizing device, the back-end of the lens group is provided with the polarizing device, an imaging sensor is provided on a back-end of the polarizing device.

Further, both the first refraction prism and the second refraction prism are isosceles triangular prisms, a chief ray emitted by the light source is perpendicular to a waist of the first refraction prism.

Further, a size of a base of the first refraction prism is the same with that of the second refraction prism, also a sum of the size of the first and the second refraction prism base is less than or equal to a size of the measured glass.

Further, the first refraction prism is connected with the second refraction prism.

Further, the polarizing device comprises two mutually perpendicular polarizers.

Further, the light source is a monochromatic source with a wave-length ranges from 500 to 900 nm.

Further, a convergent lens is provided between the light source and the light refraction element, the light emitted by the light source enters into the light refraction element after converged by the convergent lens, a distance among the light source, the convergent lens and the light refraction element satisfy the Gauss formula.

Further, an attenuation slice is provided on a light path between the light source and the imaging sensor, a light intensity is adjusted according to a requirement.

Further, the imaging sensor is one of CCD or CMOS, a front-end of CCD or CMOS is provided with a mutually perpendicular dual-polarization slice at a polarizing, direction; also the imaging sensor is a dual-polarization industrial camera based on CCD and CMOS.

Further, the imaging sensor is connected with a data processing unit.

Further, the imaging sensor is one of CCD or CMOS, also is a industrial camera based on CCD and CMOS.

According to a further aspect of the present invention that provides a multiple-tempered glass surface stress meter, which is provided with an outer frame, wherein an emitting unit, a light refraction element and an imaging unit are successively provided along a light path in the outer frame, wherein the light emitting unit comprises at least two light sources and at least two light source attitude mixture control devices, the at least two light sources are respectively fixed on the light source attitude mixture control device; the light refraction element comprises at least two refraction prisms which are respectively provided at a light emitting direction of the at least two light sources for placing measured glasses, a light emitted by each of the at least two light sources enters to the imaging unit after refracted by the refracting prisms; the imaging unit comprises at least two imaging lens tubes, at least two angle adjusting structure of imaging lens tubes and at least two imaging sensors, the imaging lens tubes are respectively provided with an optical lens and an adjusting structure of optical lens, and a magnification of the optical lens are different, front-ends of the imaging lens tubes are respectively provided at a light refraction direction of the refraction prisms, back-ends of the imaging lens tubes are respectively provided with the imaging sensors.

Further, each of the at least two light sources is a monochromatic source with a wave-length ranges from 500 to 900 nm.

Further, a filter is provided on a light path between each of the at least two light sources and the corresponding each of the at least two refraction prisms.

Further, a light intensity attenuator and light intensity attenuator adjusting structure are provided on a light path between each of the at least two light sources and corresponding each of the at least two imaging sensors.

Further, a front-end of each of the at least two imaging sensors, which is provided at the corresponding each of the imaging lens tubes, is provided with a wide-angle lens.

Further, each of the at least two imaging sensors is one of CCD or CMOS, a front-end of CCD or CMOS is provided with a mutually perpendicular dual-polarization slice, also each of the at least two imaging sensors is a dual-polarization industrial camera based on CCD and CMOS.

Further, an automatic dripping device is provided, the dripping device comprises a fluid reservoir, a transfer pump, a dripping bracket, a dripping set and a dripping control structure which are provided on the outer frame, the transfer pump and the dripping set are provided at least two, the dripping set is provided at one head of the dripping bracket, the dripping control structure controls the transfer pump to transfer the refracting liquid in the fluid reservoir to the dripping set to drip.

Further, the dripping bracket is an adjustable bracket, a location of the dripping set is adjusted freely according to the requirements.

Further, a discharge liquid catch tank is provided at a bottom of the refraction prisms on the outer frame, a discharge liquid gathering pot is arranged at a bottom of the discharge liquid catch tank, and the discharge liquid gathering pot is connected with the discharge liquid catch tank by a pipeline.

Further, each of the at least two imaging sensors is connected with a data processing unit.

The present invention that the glass surface stress meter could measure the stress of the glass surface, and to learn whether the glass meets the requirements through the stress.

DESCRIPTION OF DRAWINGS

Parts of the description and drawings that composed of the present application provides a further understand, the illustration embodiment and the instruction of the present invention is for explaining the present invention, but not limited to the present invention. In the drawings.

DETAILED DESCRIPTION OF THE INVENTION

It should be noted that embodiment of the present invention could be combined with the characteristics thereof without conflict. Hereinafter, an embodiment of the present invention will be detailed described with reference to FIGS.

According to one aspect of the present invention that provides a glass surface stress meter, the glass surface stress meter comprises a light source, a light refraction element and an imaging unit. The light refraction element is provided at a light-emitting direction of the light source for placing a measured glass. A light from the light source enters into the imaging unit to imaging after refracted by the light refractive element. The imaging unit comprises a lens group and an imaging sensor. A front-end of the lens group is provided on a light-refraction direction of the light refraction element and a back-end is provided with an imaging sensor.

Embodiment One

Figure 1:
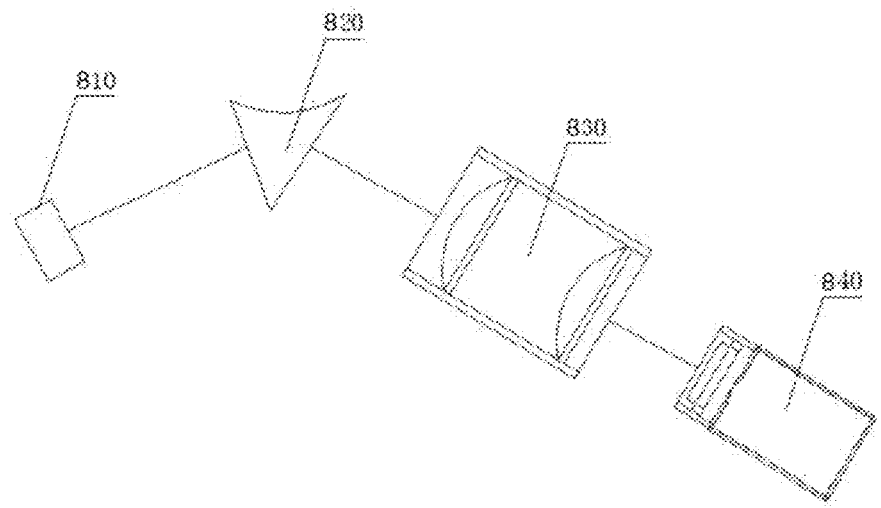
FIG. 1 illustrates a first structural schematic view of a glass surface stress meter according to the present invention.

FIG. 1 illustrates a structure view of an embodiment according to the present invention. The glass surface stress meter according to the present invention comprises a light source 810, a light refraction element and an imaging unit. The light refraction element is provided at a light-emitting direction of the light source 810, which is for placing a measured glass. A light from the light source enters into the imaging unit to imaging after refracted by the light refraction element. FIG. 1 illustrates the light refraction element of the present embodiment is a triangular prism 820 with one curved surface. The imaging unit comprises a lens group 830 and an imaging sensor 840, wherein a front-end of the lens group 830 is provided at a light refraction direction of the triangular prism 820, a back-end is provided with an imaging sensor 840 thereof. To be convenient to receive clear images, the distance among the triangular prism, the lens group and the imaging sensor satisfy the Gauss formula, which is $1/d2=1/f+1/d1$, wherein d2 is a distance between the lens group and the imaging sensor, d1 is a distance between the triangular prism and the lens group and f is a focal distance of the lens group.

A stress layer will occur on a surface after the glass is tempered, which affects the total refraction light that incident to glass surface and produces birefringence that forms two beams, wherein the two beams is perpendicular to each other and have different direction of propagation, at the polarization direction. The two beams are converted into a recognizable bright or dark fringe through the imaging unit. The glass surface stress value is obtained by calculating the interference fringe information. Therefore, a light emitted by the light source must be total reflected by a contact surface of the glass to be measured and a refraction prism when adopting the above principle to glass surface stress information. However, due to a surface of the refraction prism is a plane that can't match with the curved glass completely when the prior stress meter is adopted to test a stress of the curved glass. The light emitted by the light source can't be total reflected by a part, where the glass to be measured can't match with the refraction prism, and the stress hereof can't be tested in turn. Hereof, the light refraction element of the present invention is a triangular prism with one curved surface and the curved surface is for placing the glass to be measured. Due to one surface of the triangular prism is a curved surface, which is better to fit with the curved glass to be measured, the light emitted by the light source could be total reflected by the contact surface of the glass to be measured and the triangular prism. Meanwhile, the imaging unit of the stress meter of the present invention is provided with a lens group that could assemble and diffuse a total-reflected light from different ranges according to real requirements, and is convenient to receive clear interference image for the imaging sensor which is provided on a back-end of the lens group.

Figure 2:
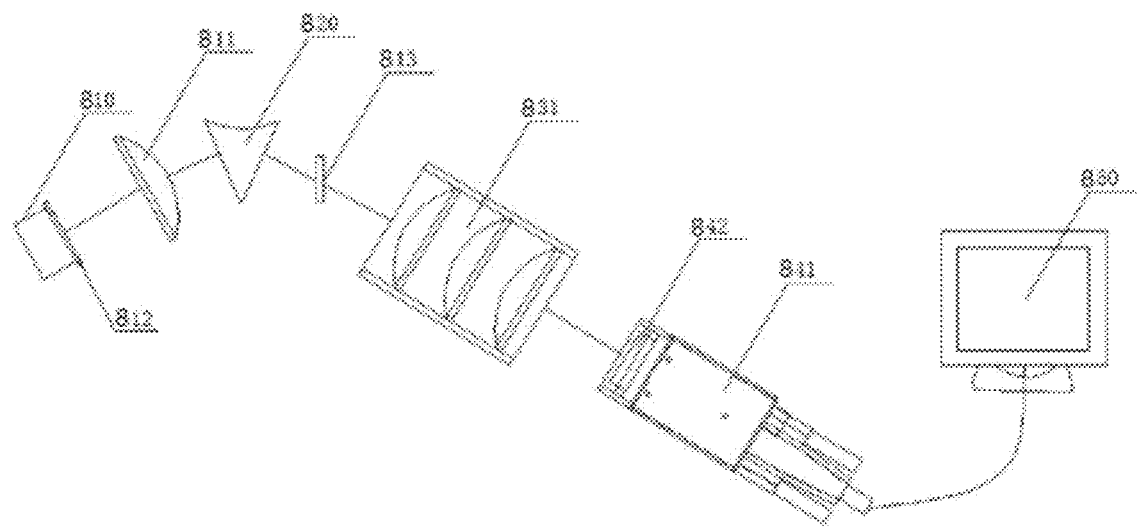
FIG. 2 illustrates the second structural schematic view of a glass surface stressmeter according to the present invention.

FIG. 2 illustrates a preferred embodiment of the present invention. As shown in FIG. 2 the stress meter comprises a light source 810, a triangular prism 820, a lens group and an imaging sensor. The triangular prism 820 is provided at a light emitted direction of the light source 810 for placing the glass to be measured. As the preferred embodiment method, the triangular prism 820 of the present embodiment is an isosceles triangular prism and an underside of the isosceles triangular prism is a curved surface, also a chief ray emitted by the light source is perpendicular to a waist of the isosceles triangular prism. As the refraction prism is an isosceles triangular prism, the chief ray which is perpendicular to the waist of the isosceles triangular prism will project perpendicular to the other waist of the isosceles triangular prism. As the chief ray enters and emits perpendicularly that greatly reduces loss of light and improves an accuracy of measurement. Besides, the stress meter of the present invention obtains a stress information of a glass to be measured by the light emitted by the light source is total reflected by the contact surface of the triangular prism and the glass to be measured. Herein, as the preferred embodiment, it improves the measuring accuracy further that a curvature of the triangular prism is the same with a curvature of the glass surface to be measured, and the glass is to be measured matches with the triangular prism completely, light emitted by the light source could reflect at any point of the glass to be measured.

Due to a different stress position to be measured on an upper and lower surface of the curved glass, a curved surface of the isosceles triangular prism could be a concave or a convexity. The curved surface of the isosceles triangular prism 820 of the embodiment is a concave, the light emitted by the light source 810 will produce a large divergence after the total reflection of the contact surface of the isosceles triangular prism and the curved glass to be measure. Herein, a light refraction of the isosceles triangular prism of the present embodiment is provided with a micro-objective 831, as seen from FIG. 2, a front-end of the micro-objective 831 is provided on the light refraction direction of the isosceles triangular prism 820, and a back-end is provided with an imaging sensor. The micro-objective 831 is easy to operate, and is able to assemble the diverging light greatly that is convenient for the imaging sensor provided at the back-end of the micro-objective to receive.

With a different bent degree of the glass to be measured, the light emitted by the light source has radiation with different degrees after it is total reflected by the contact surface. Meanwhile, different glass processing technology also leads to different density of surface stress. Choose different magnification of the micro-objective according to a different curvature of the measuring glass and different glass processing technology before testing a stress of the curved glass. In the embodiment, a radius of curvature of the measuring glass is 36 mm, the magnification of the micro-objective is 2 times to 8 times, wherein the optimum is 4 times. The micro-objective working distance is greater than half of the length of the base of the isosceles triangular prism that makes the imaging sensor provided on the back-end of the micro-objective receive clear interference fringes images, and a quality of imaging greatly improved. It is understood that the curved surface of the triangular prism of the present invention also can be a convexity. When the curved surface is the convexity, with the light emitted by the light source will converge in degree after total reflected by the contact surface between the convexity and the measuring glass. As a result, clear images will image on the image sensor without needs of larger multiple convergence of the lens group at this time. When the curvature of the curved glass is much more large, with the light is largely converge after it is total reflected, the converging light beam is diverged, appropriately through the lens group to enable the image sensor to receive the clear interference image.

The light source 810 of the present embodiment is a monochromatic source that emits light with a central wavelength, which could exclude an influence of other wavelengths to obtain the clear interference fringe image. In the present embodiment, a monochromatic light source is the preferred central wavelength ranges from 500 nm to 900 nm. Due to the light emitted from the light source is a diverging light, a converging lens 811 is provided between the light source and the triangular prism to make the light emitted from the light source to penetrates into the triangular prism 820 to the best extent of the embodiment the light emitted from the light source penetrates into the triangular prism after converged by the converging lens 811. The distance among light source, convergent lens and triangular prism satisfy the Gauss formula, which is $1/d4=1/f0+1/d3$, wherein d4 is a distance between the converging lens and the triangular prism, f is a focal distance of converging lens, and d3 is a distance between the light source and the convergent lens.

The light source of the present invention also may or may not be the monochromatic light source, herein, a band filter is provided on a light path between the light source and the imaging sensor, which filters the light emitted from the light source and makes it to be the monochromatic light. It is understood that although the light source is the monochromatic light source, a band filter also can be provided on the light path between the light source and the imaging sensor to further purify the light emitted from the light source to make it to be the monochromatic light with the narrower half band width. In the present embodiment, a band filter 812 is provided on the light path between the light source and the imaging sensor, the half band width of the band filter 812 is less than or equal to 3 nm. Also an attenuator 813 is provided on the light path between the light source and the imaging sensor of the present embodiment that users can adjust intensity of light according to the physical situation.

The imaging sensor of the present invention could one of CCD or CMOS, a front-end of CCD or CMOS is provided with mutually perpendicular dual-polarization slice on a polarizing direction. Also the imaging sensor could be a dual-polarization industrial camera based on CCD and CMOS. In the present embodiment, the imaging sensor is an industrial 841 based on CCD, a front-end of the industrial camera is provided with dual-polarization slice 842. The dual-polarization slice 842 could be connected with two mutually perpendicular dual-polarization slices at the polarizing direction, which is used for recognizing as the bright, dark fringe after the light is total reflected by the contact surface between the triangular prism and the measuring glass significantly. The imaging sensor is provided on a back-end of the dual-polarization slice which is using for photoelectric conversion, and transforms the optical information of the received bright and dark fringe into digital signals.

Preferably, the imaging sensor of the present embodiment could also connect to the data processing unit 850 according to the requirements. The data processing unit 850 finishes an accurate measuring for the curved glass surface stress according to the signal input by the imaging sensor to achieve a real-time acquisition and analysis of the measuring glass stress meter. The data processing unit 850 could be the general computer with data processing software, or the special data processor.

Firstly, to test the curvature of the measuring glass, when the stress meter of the present invention is used to test a surface stress of the curved glass. Choose the appropriate triangular prism according to the curvature of the glass to be measured, the curvature of the triangular prism surface is closer to the curvature of the measured glass, the more accurate measuring results will obtain of the present invention. Place the measuring glass on the triangular prism and make them fit with each other, then drip a little refracting liquid on the contact surface between the measuring glass and the triangular prism, thus to improve the measuring accuracy. Adjust the light source and best to set the light source in the angle perpendicular to the incident edge of the triangular prism. The light emitted from the light source enters into the imaging unit after total reflected by the contact surface between the measuring glass and the triangular prism, the total reflected light enters into the two mutually perpendicular dual-polarization slices after appropriate adjusted by the lens group in the imaging unit, the light beam is significant recognized as bright, dark fringe through the dual-polarization slices. After the photoelectric conversion of the bright and dark fringe received by the imaging sensor in the dual-polarization slices, and then input the obtained signal into the data processing unit and completes the final accurate testing of the surface stress.

The common tempered glass surface stress meter comprises a light source, a refracting prism, an eyepiece and an industrial camera. The refraction prism is a plane prism and is provided at a light emitting direction of the light source, one head of the eyepiece is provided on the light refracting direction of the birefringent prism and another head is connected with the industrial camera. Place the measuring glass on the surface of the refracting prism and then the light emitted from the light source enters into the industrial camera to imaging after refracted by the refracting prism when using this stress meter to test. However, using the stress meter in the prior art to measure the curved glass surface stress due to the refracting prism is a plane prism, and they could not fit with each other when placing the curved glass on the surface of the refracting prism, the light emitted from the light source is hard to be total refracted by the part that can not be fitted. As a result, this kind of the stress meter is unable to measure the curved glass surface tress meter.

The benefit of the embodiment one and the embodiment two are that the light refracting element of the present invention is a triangular prism with one surface is a curved surface. Curved surface of the triangular prism could be fitted with the measuring glass, and the monochromatic light emitted from the light source is total refracted by the contact surface between the triangular prism and the measuring curved glass. Thus, the total refracting light contains the birefringence information of the measured glass and then enters into the imaging unit to imaging, so that the surface stress information of the measured glass can be measured. As the preferred scheme, the triangular prism of the present invention is an insolence triangular prism, the base of the insolence triangular prism is a curved surface and a chief ray emitted from the light source is perpendicular to a waist of the triangular prism. As the refracting prism is an isosceles triangular prism, the chief ray which is perpendicular to the waist of the isosceles triangular prism will emit perpendicular to the other waist. As the chief ray enters and emits perpendicularly that greatly reduces loss of light and improves an accuracy of measurement. The lens group in the imaging unit adopts the micro-objective that is convenient to operate. Meanwhile, the micro-objective working distance is greater than the half of the length of the base of the isosceles triangular prism that makes the imaging sensor provided on a back-end of the micro-objective receive clear interference fringes images, and the quality of imaging greatly improved. The curvature of the triangular prism of the present invention is the same with the curvature of the measured glass surface, thus, when adopts the present invention to measure the curved glass surface stress meter that the measuring glass could be complete fitted with the triangular refracting prism, and the light emitted from the light source could be total reflected at any parts on the measuring glass, and further improve the measuring accuracy.

Figure 3:
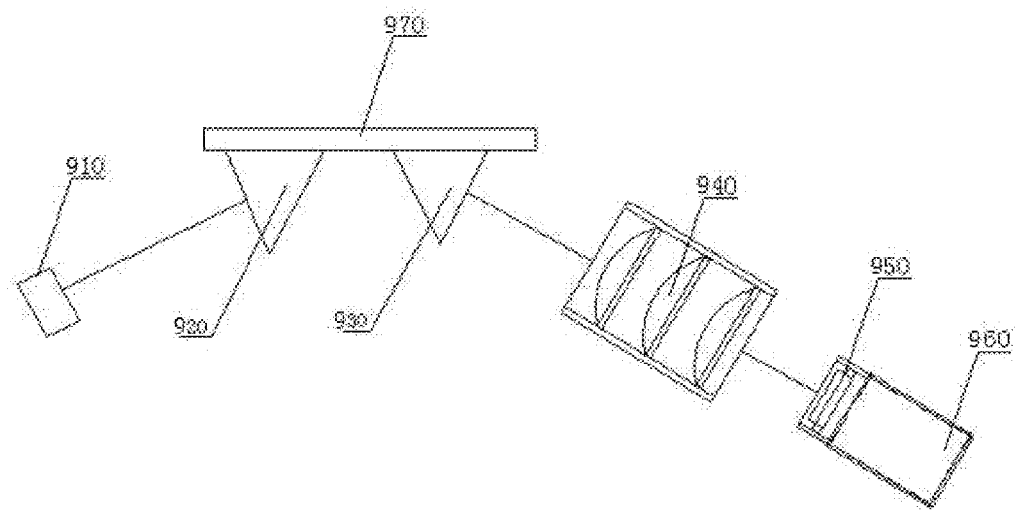
FIG. 3 illustrates the third structural schematic view of a glass surface stress meter according to the present invention.

FIG. 3 illustrates an embodiment structure view of a glass surface stress meter of the present invention. As shown in FIG. 3, the glass surface stress meter of the present embodiment comprises a light source 910, a light refraction element, an imaging unit. The light refracting element is provided at a light-emitting direction of the light source for placing the measuring glass 970, and the light emitted from the light source enters into the imaging unit after reflected by the refracting element. As shown in FIG. 3, the light refracting of the present embodiment is provided with a first refracting prism 920 and a second refracting prism 930 along a light path direction. The imaging unit comprises a lens group 940, a polarizing device 950 and an imaging sensor 960. A front-head of the lens group 940 is provided at a light refraction direction of the second refracting prism 930, wherein a back-head is connected with the polarizing device 950. The polarizing device is used for separating the light component emitted from the second refracting prism into two light components, respectively are the parallel vibration and vertical vibration relative to the contact surface of the glass and the second refraction prism. And the two light components are significantly recognized as bright and dark fringes. The back-end of the polarizing 950 is provided with an imaging sensor 960. To receive a clear images for the imaging sensor 960, a distance among the second refracting prism 930, the lens group 940 and the imaging sensor 960 should satisfy the Gauss formula, which is $1/d2=1/f+1/d5$, wherein d2 is a distance between the lens group, and the imaging sensor, d5 is a distance between the second refracting prism and the lens group, and f is a focal distance of converging lens.

Figure 5:
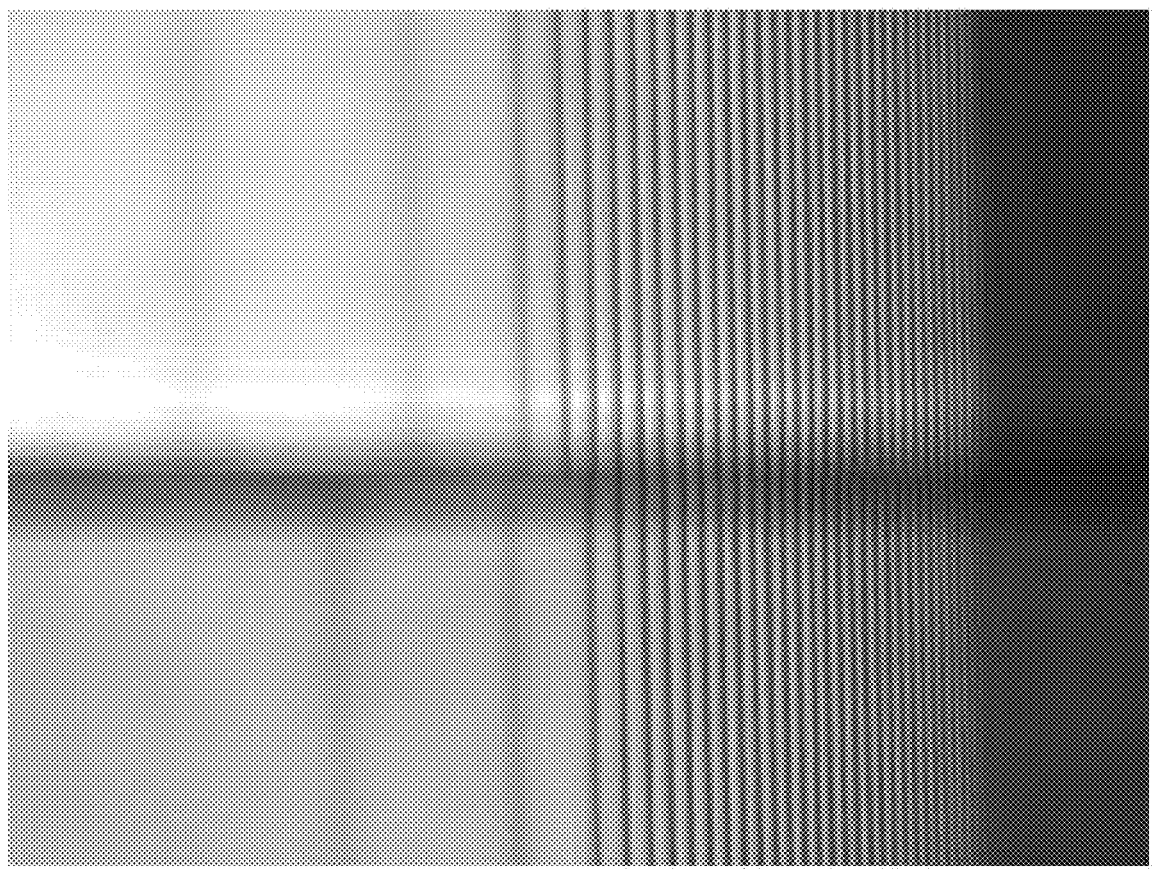
FIG. 5 illustrates an interference fringe image obtained by the prior glass surface stress meter.
Figure 6:
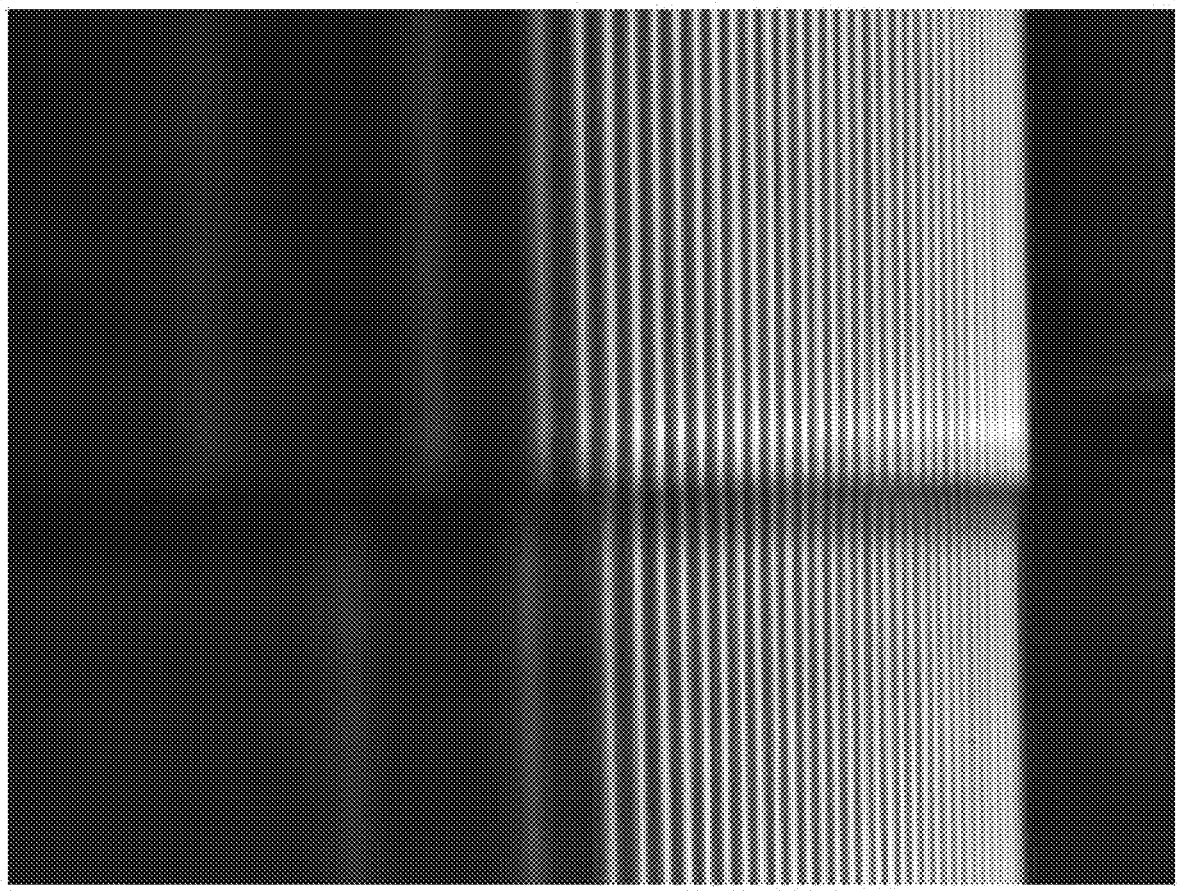
FIG. 6 illustrates an interference fringe image obtained by a glass surface stress meter of the third structural schematic view according to the present invention.

Stress layer will occur on the surface after the glass is tempered, which affects the total refraction light that penetrates to glass surface and produces birefringence that forms two beams, wherein the two beams is perpendicular to each other and have different direction of propagation, at the polarization direction. The two beams are converted into to recognizable bright or dark fringes through the imaging unit. The surface stress value of the tempered glass is obtained by comparing the corresponding relationship between the two group bright and dark fringes. However, due to the light emitted from the light source is total reflected by the contact surface of the refracting prism and the measuring glass, wherein parts of the total refracting light satisfied the wave-guide mode will transmit along an internal of the glass until emitting from the glass side. Imaging unit receives images with attenuation brightness due to the light energy loss of the emitted parts, and the attenuation of the imaging brightness results decreasing of the contrast of the bright and dark fringes. As shown in FIG. 5, the dark fringe of the interference fringe image obtained by the imaging unit is thinner, and it chooses automatically and compares the correspondence relationship between the related dark fringes in the two fringes when in imaging processing. Due to a border between the dark fringes and bright fringes is not clear, especially for the dark fringes. Low measuring accuracy is resulted that it is hard to obtain the accurate correspondence relationship of the two fringes when in imaging processing. Thus, the stress meter of the present invention is provided with a first refracting prism and a second refracting prism at a direction of the light path. The total reflected light transmits along the internal glass enters into the second refracting prism after coupled, and it is imaging in the imaging unit which is provided at a back-end of the second refracting prism, after emitted from the second refracting prism. Due to the total reflected light that transmits along the inner glass has not spread out from the end surface to the outside of the glass after through the first refracting prism, but to be coupled into the second refracting prism and then received by the imaging unit. Result that the brightness of the imaging received by the imaging unit isn't attenuated and has a higher contrast ration of the bright fringe and dark fringe. Meanwhile, the bright fringe of the interference fringe image is thinner because the image received by the imaging unit is resulted from the total refracted light interference that transmits along the inner glass after through the first refracting prism. As shown in FIG. 6, the correspondence relationship between the relevant bright fringe in the two fringes will be selected to compare automatically when in imaging processing. Due to the clear bright fringe and higher contrast ratio between the bright, and dark fringe, the correspond relationship of the relevant bright fringe in the two fringes is able to obtain accurately when in imaging processing, that minimize measuring error and maximize measuring precision.

Figure 4:
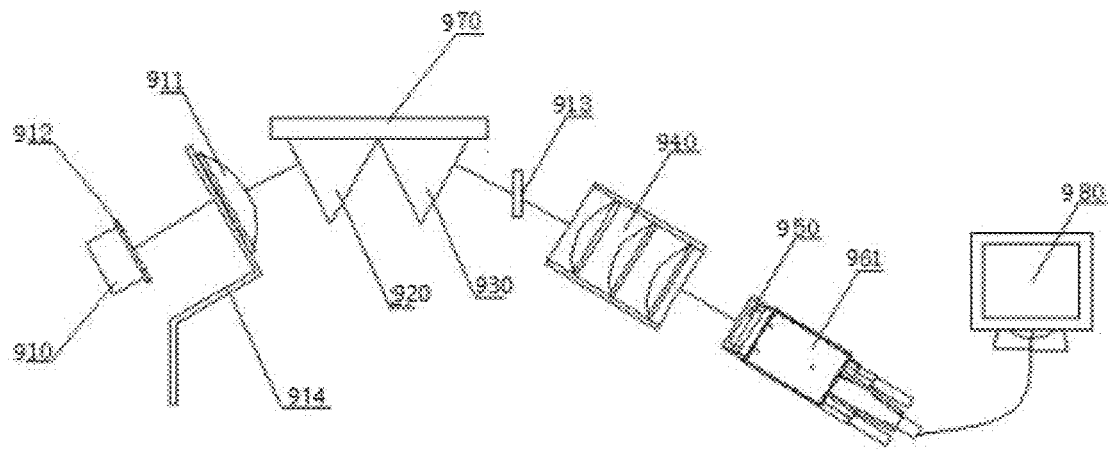
FIG. 4 illustrates the fourth structural schematic view of a glass surface stress meter according to the present invention.

FIG. 4 illustrates a preferred embodiment of the present invention. The stress meter as shown in FIG. 4 comprises a light source 910, a first refracting prism 920, a second refracting prism 930, a lens group 940, a polarizing device 950 and an imaging sensor 960. The first refracting prism 920 and the second refracting prism 930 are used for placing the measuring glass, a front-head of the lens group 940 is provided at a light refraction direction of the second refracting prism 930, wherein a back-head of the lens group 940 is connected with the polarizing device 950. A back-end of the polarizing 950 is provided with an imaging sensor 960. As the preferred embodiment, the first refracting prism 920 and the second refracting prism 930 of the present invention are isosceles triangular prisms, and a chief ray emitting from the light source 910 is perpendicular to a waist of the first refracting prism 920. Thus, the chief ray which is perpendicular to the waist of the first refracting prism will emit with the method to be perpendicular to a waist of the second refracting prism. As the chief ray enters and emits perpendicularly that greatly reduces loss of light and improves an accuracy of measurement. In the presented embodiment, a base size of the first refracting prism 920 is the same to a base size of the second refraction prism 930, and a sum of the two base are less than or equal to the size of the measuring glass 970. Thus, the total refracted light transmits along an internal glass after total refracted by the first refracting prism can be totally coupled to the second refracting prism 930. The light loss that caused by transmitting from the glass end surface to an outside of the glass avoids, and an accuracy of the measurement improves. As shown in FIG. 4, the first refracting prism 920 is connected with the second refracting prism 930, which is further to improve a measuring accuracy of the present invention.

The light source 910 of the present embodiment is a monochromatic source that emits light with a central wavelength, which could exclude the influence of other wavelengths to obtain a clear interference fringe image. In the present embodiment, a monochromatic light source is the preferred central wavelength ranges from 500 to 900 nm. Due to the light emitted from the light source is a diverging light, a converging lens 911 is provided between the light source 910 and the first refracting prism 920 to make a light emitted from the light source to penetrate into the first refracting prism 920 to the most extent of the present embodiment. The light emitted from the light source penetrates into the first refracting prism after converged by the converging lens 911. The distance among the light source, the convergent lens 911 and the first refracting prism satisfy the Gauss formula, which is $1/d4=1/f0+1/d3$, wherein d4 is a distance between the converging lens and the first refracting prism, f0 is a focal distance of converging lens, and d3 is distance between the light source and the convergent lens. For the convenience of the operation, the measuring meter of the present invention also comprises a lens bracket 914 for arranging a convergent lens 911, the lens bracket 914 is composed of a first support plate, a second support plate and a third support plate, wherein a convergent lens is provided at the first support plate, an included angle between the first support plate and the second support plate is 90°, while the degree between the third support plate and second support plate is 120°. The third support plate should be placed be perpendicular to a worktable when using. The light emitted from the light source 910 penetrates into the first refracting prism 920 after converged by the convergent lens which is provided on the first support plate. To let a chief ray emitted from the light source emit that is perpendicular to an incident edge of the first refracting prism, the first support plate of the lens bracket is provided parallel to the incident edge, thus the first refracting prism is an equilateral triangular prism. To let the chief ray which is perpendicular to the incident edge of the first refracting prism emit that is perpendicular to an emitting edge of the second refracting prism, the second refracting prism is also an equilateral triangular prism. As both the first refracting prism and the second refracting prism are the equilateral triangular prism that increases the integration level of the stress meter of the present invention. The device of the present invention of the occupies small place, has a reasonable structure and is convenient to use.

The light source of the present invention also may or may not be the monochromatic light source, herein, a band filter is provided on the light path between the light source and the imaging sensor, which filters the light emitted from the light source and makes it to be the monochromatic light. It is understood that although the light source is the monochromatic light source, a band filter also can be provided on the light path between the light source and the imaging sensor to further purify the light emitted from the light source to make it to be the monochromatic light with the narrower half band width. In the present embodiment, a band filter 912 is provided on the light path between the light source and the imaging sensor, the half band width of the band filter 912 is less than or equal to 3 nm. Also an attenuator 913 is provided on the light path between the light source and the imaging sensor of the present embodiment that users can adjust intensity of light according to the physical situation.

The polarizing device of the present invention is connected with two mutually perpendicular dual-polarization slices at the polarizing direction, a back-end of the two polarizing slices are provided with a imaging sensor, the imaging sensor could be one of the CCD or CMOS, also could be an industrial camera based on CCD or CMOS. In the present embodiment, the imaging sensor is an industrial camera 961 based on CCD, which is used for photoelectric conversion, and transforms the optical information of the received bright and dark fringe into digital signals.

As the preferred embodiment, the imaging sensor 960 of the present embodiment also can connect with a data processing unit 980 if required. The data processing unit 980 completes the accurate measurement for the tempered glass surface stress according to the signal input by the imaging sensor to achieve the real-time acquisition and analysis of the measuring glass stress meter. The data processing unit 980 could be the general computer with data processing software, or the special data processor.

Firstly to choose appropriate the first refracting prism and the second refracting prism according to the measuring glass dimension when the stress meter of the present invention is used to test the tempered glass surface stress. More accurate measurement of the present invention has been obtained when the first refracting prism and the second refracting prism are the isosceles triangular prism. The more accurate measurement will be further improved when a base size of the first refracting prism is the same to a base size of the second refraction prism, and a sum of the two bases are less than or equal to the size of the measuring glass. Place the measuring glass on the first refracting prism and the second refracting prism to make their bases abut against the glass to be measured completely, and then drip a little refracting liquid on the contact surface so that the measuring glass could be better fit with the first refracting prism and the second refracting prism, thus improving the measuring accuracy. Adjust the light source and best to set the light source in the angle perpendicular to the incident edge of the first refracting prism. The light emitted from the light source is total reflected by the contact surface between the measuring glass and the first refracting prism, and some of the total reflected light, which is satisfied the Wave-guide Mode will transmit along an internal of the glass to the second refracting prism after bounded by the glass surface, and coupled into the second refracting prism. It enters into the imaging unit which is provided on a back-end of the second refracting prism after emitting from the second refracting prism. The received light penetrates into the polarizing device on the back-end after appropriate adjustment made by the lens group which is provided on in the imaging unit, and the light is significant recognized as two fringe lines with bright, dark fringe through the polarizing device. After the photoelectric conversion of the fringe lines with bright and dark fringe received by the imaging sensor, and then input the obtained signal into the data processing unit to complete the final accurate measurement of the tempered glass surface stress.

At present, the common tempered glass surface stress meter comprises a light source, a refracting prism, an eyepiece and an industrial camera. The refracting prism is provided at a light emitting direction of the light source, one head of the eyepiece is provided at the light refracting direction of the refracting prism while the other head is connected with the industrial camera. Place the measuring glass on the surface of the prism, so as to make the prism fit with the measuring glass, the light emitted from the light source penetrates to the refracting prism and is total reflected on a contact surface of the refracting prism and the measuring glass, when the stress meter is used to measure the tempered glass surface stress meter. Because there is stress on the tempered glass surface, the total refracted light penetrated on the glass surface will produce birefringence which is resulted from the stress layer, and form two mutual perpendicular beams at the polarizing direction. The two light beams are converted to two fringe lines with bright and dark fringes phase-to-phase that are easily identified after passing through the eyepiece and the industrial camera, and the glass stress is calculated by comparing the positional correspondence relationship between the relevant bright or dark fringe in the two fringe lines. However, although the interference fringe images could be obtained after the light emitted from the light source is total reflected by the contact surface of the prism and the measuring glass, due to parts of the total reflected lights satisfy the Wave-mode will emit from the end surface of the glass after bounded by the glass surface, the brightness of the image received by the industrial camera is attenuated by the emitted light energy loss, image bright attenuation results lower contrast ration of the bright and dark fringe and unclear fringe border, when the prior stress meter is used to measure the tempered glass surface stress. Moreover, the dark fringe is thinner of the obtained interference fringe image by the prior stress meter, and the correspond relationship of the relevant dark fringe in the two fringe lines will be selected to compare automatically when in imaging processing, thus to calculate the stress of the tempered glass. Due to the lower contrast ratio of the dark and bright fringe and unclear fringe border, the correspond relationship of the relevant dark fringe in the two fringe lines is unable to obtain accurately when in imaging processing, resulting large measuring error and low measuring precision of the prior stress meter.

The advantages of the embodiment three and embodiment four are that the light refracting element of the stress meter of the present invention is provide with a first refracting prism and a second refracting prism along the optical path, the measuring glass is put on the first refracting prism and the second refracting prism. After the light emitted by the light source is totally reflected at the contact surface of the first refracting prism and the measuring glass after it penetrates to the first refracting prism, and parts of the total reflected light which is satisfied the Wave-mode transmits along the internal of the glass after bounded by the glass surface. Due to a second refracting prism is arranged at the light path direction, the total reflected light transmits along the internal of the glass is coupled into the second refracting prism, then emitting from the second refracting prism and entering into the imaging unit which is arranged at the back-end of the second refracting prism to imaging. Due to the total reflected light that transmits along the inner glass has not spread out from the end surface to the outside of the glass after through the first refracting prism, but to be coupled into the second refracting prism sand then received by the imaging unit. Result that the brightness of the imaging received by the imaging unit isn't attenuated and has a higher contrast ration of the bright fringe and dark fringe and a clear fringe border. The bright fringe of the interference fringe image is thinner because the image received by the imaging unit is resulted from the total refracted light interference that transmits along the inner glass after through the first refracting prism, and the correspond relationship of the relevant bright fringe in the two fringes will be selected to compare automatically when in imaging processing. Due to the clear bright fringe and higher contrast ratio of the bright and dark fringe, the correspond relationship of the relevant bright fringe in the two fringes is able to obtain accurately when in imaging processing, that minimize measuring error and maximize measuring precision. As the preferred embodiment, the first refracting prism and the second refracting prism of the present invention are isosceles triangular prism, and the chief ray emitted by the light source is perpendicular to the waist of the first refracting prism. That the chief ray which is perpendicular to the waist of the first refracting prism will emit to be perpendicular to the waist of the second refracting prism due to both of the first and the second isosceles triangular prism. As the chief ray enters and emits perpendicularly that greatly reduces loss of light and improves the accuracy of measurement. Due to the base size of the first refracting prism is the same to the base size of the second refraction prism, and the sum of the two base are less than or equal to the size of the measuring glass. Thus, the total refracted light transmits along the internal glass after total refracted by the first refracting prism can be total coupled to the second refracting prism. The light energy loss that results from spreading out from end surface to outside of the glass has been avoided, and the accuracy of the measurement has been improved. The first refracting prism is connected with the second refracting prism which is further to improve the measuring precision of the present invention.

According to another aspect of the present invention, that provides a multiple-tempered glass surface stress meter.

Figure 7:
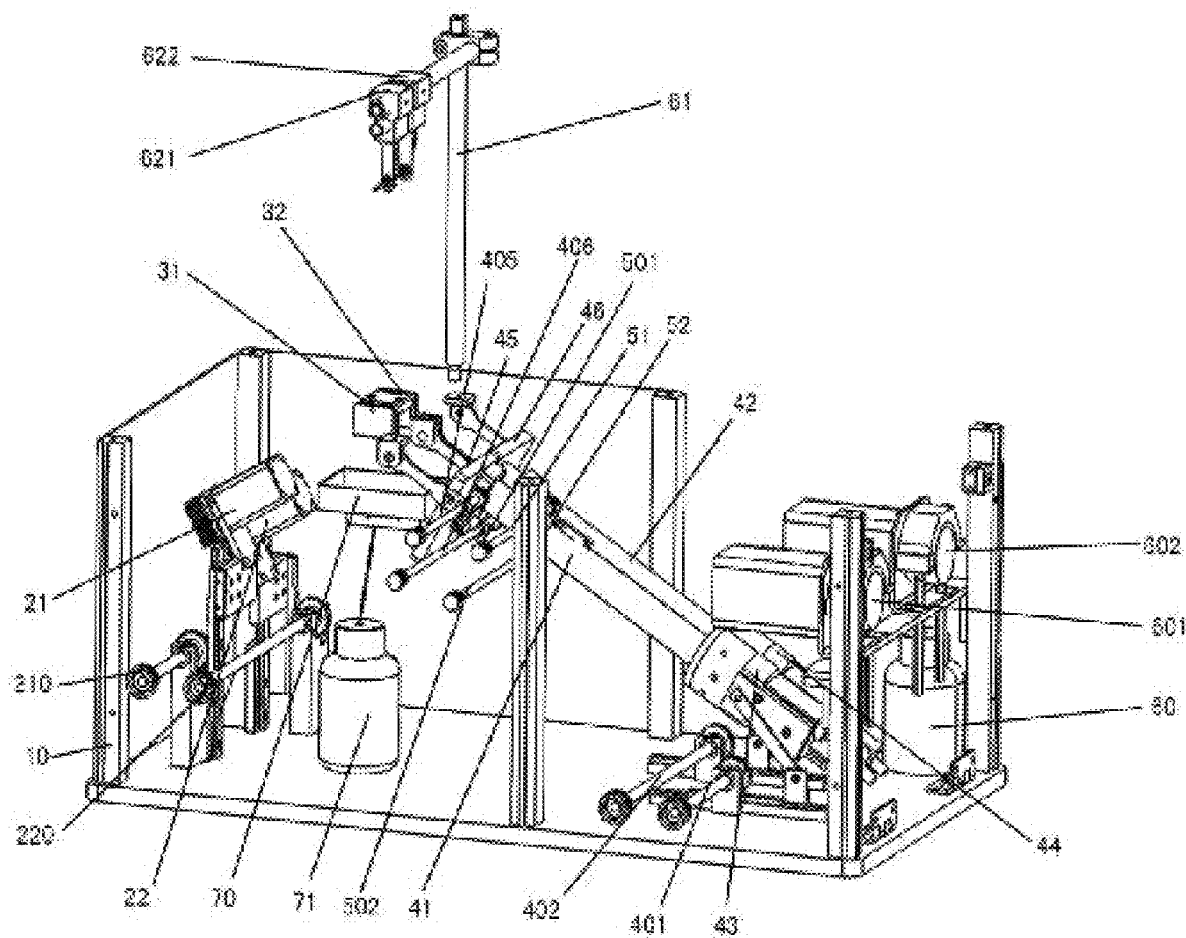
FIG. 7 illustrates a structural schematic view of a multiple-tempered glass surface stress meter according to the present invention.

FIG. 7 illustrates a structural schematic diagram of a multiple-tempered glass surface stress meter of the present invention. Due to adopts a single optical system, other interference fringes is resulted an equal mapification effects if magnify one of the interference fringes when testing the multiple-tempered glass surface stress meter. However, at least one of the fringes is hard to read accurately while magnifying same multiples of the various interference fringes with different specifications, thus multiple optical systems are adopted to test the surface stress of the multi-tempered glass of the present invention.

The present embodiment adopts the double optical paths aimed at the second tempered glass. As shown in FIG. 7, an outer frame 10 is provided with a light emitting unit, a light refracting element and an imaging unit along an optical path, wherein the light emitting unit comprises two light sources 21 and 22, two height adjustment device of light source 210 and 220, the light source 21 and 22 are respectively fixed on the height adjustment device of light source 210 and 220, a light emitting angle of the light source is adjustable according to an actual situation when using, which leads the light emitted by the light source results critical reflection at the measuring glass after passing the refracting lens, and improve the measuring precision. The height adjustment device of light source 210 and 220 could be any structure that can adjust a height of the light source, such as the outer frame is provided with a light, source, lift frame, which is connected with a lift adjusting handle drively through a rack-and-pinion drive mechanism, the light source is fixed on the light source lift frame, and the ascend and descend of the light source is realized through the lift adjusting handle. The light refracting element comprises two refracting prism 31 and 32 which are respectively provided at a light emitting direction of the light source 21 and 22 for placing the measuring glass, and light emitted by the light source 21 and 22 enter into the imaging unit to imaging after refracted by the refracting prism 31 and 32. Certainly, a band filter can also be provided on a light path between the light source and the imaging sensor in order to avoid the influence resulted from the parasitic light. The filter could be the band filter like the interference filter, also could be a light beam with a certain spectral width of monochromatic light that enters into the imaging lens tube, and a measuring precision is further improved.

The imaging unit of the embodiment comprises two imaging lens tubes 41, 42, two angle adjustment mechanisms of the imaging lens tube 401, 402, two imaging sensors 43 and 44, lens 51, 52 are provided in the imaging lens tubes respectively, outer surface of the imaging lens tubes respectively provided with lens adjustment structure 501, 502 used to adjust lens 51, 52. To obtain the two interference fringe information accurately at the same time, different magnification is required by the first and the second strengthened fringes. Thus, the magnification of the lens 51 and 52 is different, and the focal length of the lens 51 is 100-150 mm while the focal length of the lens 52 is 100-200 mm. Front-head of imaging tube 41, 42 is arranged at the light refracting direction of the refracting prism 31, 32, while back-head is respectively provided with the imaging sensor 43, 44. The imaging sensor 43, 44 could be one of the CCD or CMOS, front-head of CCD or CMOS is provided with a dual-polarization slice which is perpendicular to each other. Besides, imaging sensor 43, 44 also could be an industrial camera based on CCD or CMOS. Preferably, light source 21, 22 of the present embodiment adopts a monochromatic light with the wave-length ranges from 500-900 nm. The imaging sensor 43, 44 is a dual-polarization industrial camera based on CCD, that the interference of the two mutual orthogonal emitted from the glass after birefringence is avoided, thus making the two light could be recognized as two parts obviously and improving the measuring precision.

The optical path between the light source 21, 22 and imaging sensor 43, 44 of the present embodiment is respectively provided with a light intensity attenuator 45, 46 and an adjustment structure of light intensity attenuator 405, 406, placement of the light intensity attenuator 45, 46 is unlimited. Free adjustment for bright and dark light is available according to the production process to accommodate the imaging sensor to detect. The imaging tubes 41, 2 of the present invention also has two wide-angle lens (not show in picture), which is respectively arranged on the back-end of the imaging sensor 43, 44 to prevent limited angular field of view and avoid the magnified fringes that couldn't be recognized completely.

Few refracting liquid is required to drip on the refracting prism to improve the measuring precision before placing the glass on the surface on the refracting prism when the glass surface stress meter is used to test. The stress meter of the present embodiment is provided with an automatic dripping device. As shown in FIG. 7, the dripping device comprises a fluid reservoir 60, a transfer pump 601, 602, a dripping bracket 61, a dripping set 621, 622 and a dripping control structure which are provided on the outer frame 10. The dripping set 621, 622 are arranged on the one head of the dripping bracket 61, refracting liquid in the fluid reservoir 60 is transferred into the dripping set 621, 622, by the transfer pump 601, 602, which is controlled by the dripping control structure, to achieve automatic dripping. Preferably, the dripping bracket is an adjustable bracket and the placement of the dripping set is adjustable if required. Any device with dripping control function could be the dripping control structure of the present invention, such as a computer with controlling and processing function. A discharge liquid catch tank 70 is positioned at the bottom of the refraction prism 31, 32 in the outer frame of the present embodiment, a the discharge liquid gathering pot 71 is arranged at the bottom of the discharge liquid catch tank, and the discharge liquid gathering pot is connected with the discharge liquid catch tank by the pipeline. Refracting liquid after use is collected through the waste liquid catch tank, which prevents liquid drop on the instrument that affects the service life.

Preferably, the imaging sensor of the present invention could connect a data processing unit if required. The data processing unit completes the accurate measurement for the multiple-tempered glass surface stress according to the signal input by the imaging sensor to achieve the real-time acquisition and analysis of the measuring glass stress meter. The data processing unit could be the general computer with data processing software, or the special data processor.

Figure 8:
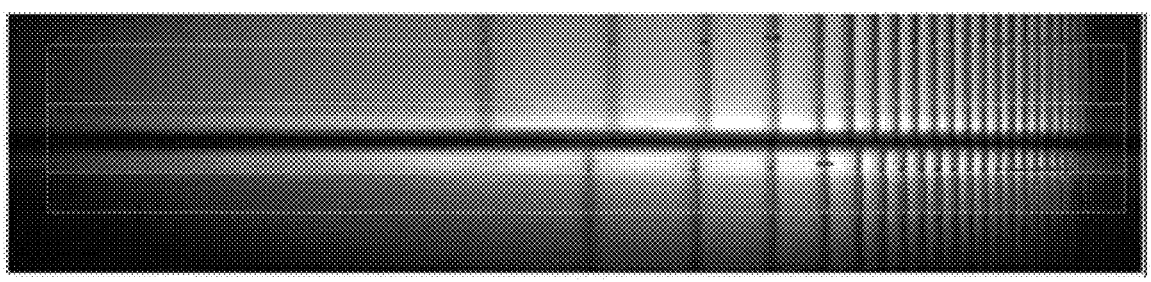
FIG. 8 illustrates an application effect of a multiple-tempered glass surface stress meter according to the present invention.
Figure 8:
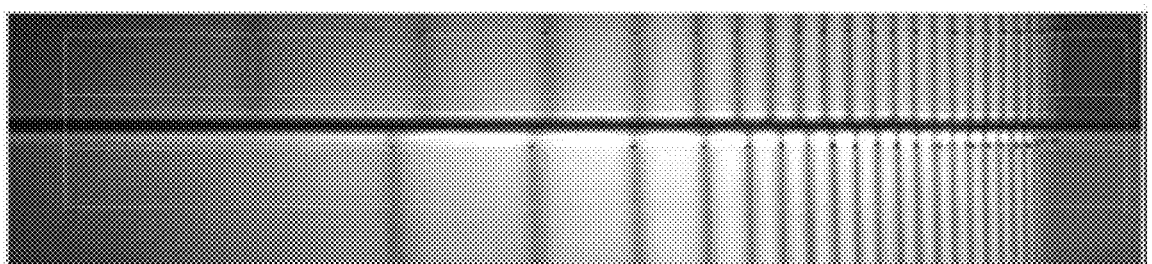

FIG. 8 is the use effective view of the present invention that tests the second tempered glass surface, stress meter, wherein, FIG. 8(a) is the effective view of the read second strengthened fringes, FIG. 8(b) is the effective view of the read first strengthened fringes. As shown in FIG. 8(a), the second strengthened interference fringes is much more clear, while the first strengthened interference fringes is unclear that is hard to recognize accurately when reading the second strengthened interference fringes. When the the effective view of the read first strengthened fringes is read in FIG. 8(b), the first strengthened interference fringes is so clear that is easy to recognize accurately due to adjust and magnify large multiples the focal distance of the lens. Herein the second strengthened fringes become such thick that is hard to determine the position due to the magnification of the large multiples. Due to the multiple optical path system design is adopted in the present invention, different degree of the adjustment is available according to the characters of different interference fringes. Thus, various interference information could be read in one measurement, and the measuring precision and effect is improved greatly.

All the adjustable structure of the above embodiment can adopts the prior arts in the art.

When the stress meter of the present invention is used to test the multiple-tempered glass surface stress, drop few refracting liquid on the refracting prism surface through the automatic dripping device, and then place the measuring glass on the refracting prism which is drop with the refracting liquid. The height of the light source is adjusted by the altitude mixture control device of the light source and to an appropriate light emitting angle, result critical reflection at the measuring glass through the refracting prism, and improve the measuring precision. The light enters into the imaging lens to image identification after the light reflected by the refracting prism, the recognized image is converted into the digital signal with the glass surface stress information through the image sensor, and achieves the final stress calculation by the data processing element at last. Due to the multiple optical path system design is adopted in the present invention, the angle of the light source, lens and the imaging tubes could be adjusted at the same time through the light source height adjusting device, lens adjust structure and angle adjustment of the imaging lens tube to result at least one quite clear interference fringe in each light path. In this way, the image recognition of the one and multiple strengthened interference fringes can be carried out at the same time without mutual influence, and the measuring precision and effect is improved.

The common tempered glass stress meter comprise a light source, a birefringent prism, a micrometer and an industrial camera. The birefringent prism is arranged at the light emitting direction of the light source, one head of the micrometer is arranged at the light refracting direction of the birefringent prism and the other head is connected with the industrial camera. Place the measuring glass on the surface of the birefringent prism, the light emitted by the light source enters into the industrial camera to imaging after refracted by the birefringent prism when the stress meter is used to test. However, it is found that the density of interference fringes of the multiple tempered glass is obviously different after multiple tempered, when the stress meter is used to test the stress of the multiple-tempered glass. The interference fringe tempered in one time is more and dense, while the interference fringe tempered in multiple times is light but thick. Due to the one strengthened interference fringe is more and dense which is hard to recognize and judge, that needs to magnify the fringes. However, the magnified fringe couldn't be recognized completely limited to the angle scope of the micrometer that this stress meter is unable to test the surface stress meter of the multiple-tempered glass. Utility model patent in China CN201520111147.8 discloses a second tempered glass automatic glass surface stress meter, filled a gap in the second tempered glass detecting industry through arranging a wide-angle lens at the front-head of the industrial camera and adjusting the light source. When the stress meter is used to test the second tempered glass, although the wide-angle lens at the front-head of the micrometer can recognize all fringes, the second strengthened fringe will become thicken due to the magnification, the position the second fringes still hard to read and can only get one valuation, thus affecting the measuring precision.

The advantages of the multiple-tempered glass surface stress meter is that provided with at least two light sources, birefringent prisms, imaging tubes, and imaging sensors. The stress meter of the present invention is able to read one and multiple strengthened fringes at the same time through adopting the multiple optical path system, thus the measuring precision and efficiency is improved greatly. Due to the obvious difference between the one strengthened fringe and the second strengthened fringe, the one tempered fringe is more and dense, while the multiple tempered fringe is light but thick, that the magnification of the lens on the optical path of the present invention is different. Lens magnification of the optical path that recognizes one strengthened fringe is lager than that recognizes multiple strengthened fringe, that the one strengthened fringe could be magnified considerably when using and thus to read one strengthened fringe accurately and rapidly. The multiple strengthened fringe is minor magnified to guarantee that is easy to determine the position of the multiple strengthened fringe. The imaging tubes of the present invention also has a wide-angle lens, which is arranged on the front-head of the imaging sensor to prevent limited angular field of view and avoid the magnified fringes that couldn't be recognized completely. The present invention provides an automatic dripping device, that is able to drip on the refracting prism automatically according to the requirement, and avoids manual operation which wastes time and energy. A discharge liquid catch tank is positioned at the bottom of the refraction prism, which is able to collect the used refracting liquid, and prevent liquid drop on the instrument that affects the service life. Users can adjust the adjustment structure of the lens, micrometer angle adjustment device and the height adjustment of the light source freely according to the actual situation, and is easy to use.

The above description is only the preferred embodiment of the present invention, and not limiting the present invention. For those skilled in the art from this disclosure that various change and modification can be made herein. All in the essence and principle of the invention, any modification, equivalent replacement and correction should be contained in the protection range of the present invention.

What is claimed is:

1. A glass surface stress meter, comprising:
a light source;
a light refraction element, and
an imaging unit, the light refraction element is provided at a light-emitting direction of the light source for placing a measured glass, a light from the light source enters into the imaging unit to imaging after refracted by the light refraction element, wherein the imaging unit comprises:
a lens group;
an imaging sensor, and
a polarizing device, a front end of the lens group is provided on a light-refraction direction of the light refraction element and a back-end is provided with the imaging sensor; the back-end of the lens group is provided with the polarizing device, an imaging sensor is provided on a back-end of the polarizing device;
the light refraction element is provided with a first refraction prism and a second refraction prism along a direction of an optical path, the front-end of the lens group is provided on a light refraction direction of the second prism, the first refraction prism and the second refraction prism are isosceles triangular prisms, a chief ray emitted by the light source is perpendicular to a side surface of the first refraction prism and traverses the side surface at a middle portion of the side surface; wherein a size of a base of the first refraction prism is the same with that of the second refraction prism, also a sum of the size of the first and the second refraction prism base is less than or equal to a size of the measured glass; a band filter is provided on a light path between the light source and the imaging sensor.

2. The glass surface stress meter as claimed in claim 1, wherein the first refraction prism is connected with the second refraction prism.

3. The glass surface stress meter as claimed in claim 1, wherein the polarizing device comprises two mutually perpendicular polarizers.

4. The glass surface stress meter as claimed in claim 1, wherein a convergent lens is provided between the light source and the light refraction element, the light emitted by the light source enters into the light refraction element after converged by the convergent lens, a distance among the light source, the convergent lens and the light refraction element satisfy the Gauss formula.

5. The glass surface stress meter as claimed in claim 1, wherein the imaging sensor is one of CCD or CMOS, also is a industrial camera based on CCD or CMOS.

* * * * *